350-96.25 SR

XR 3,212,397

CROSS REFERENCE SEARCH ROOM

TX3074T
X 3076N

Oct 3,212,397

KEYSTONE-DISTORTION CONTROLLING SYSTEM

Filed June 25, 1962

INVENTOR.
WENDELL S. MILLER
BY William P. Green
ATTORNEY

3212397
OR IN 353/70

United States Patent Office 3,212,397
Patented Oct. 19, 1965

3,212,397
KEYSTONE-DISTORTION CONTROLLING SYSTEM
Wendell S. Miller, 1341 Comstock Ave.,
Los Angeles, Calif.
Filed June 25, 1962, Ser. No. 205,045
3 Claims. (Cl. 88—24)

This invention relates to an improved type of device for purposely distorting in a predetermined manner an image being transmitted through the device. The unit is in certain respects especially effective for use in projecting an image on a screen which is inclined with respect to the projector, in which case the device may function to automatically distort the image prior to projection in a manner compensating for the errors which would otherwise occur in the final projected image as a result of the inclination of the screen. In the particular form of the invention illustrated in the drawings of this application, the distorter takes the form of a fiber optic unit, though it will be understood that in its broadest aspects the invention contemplates the use of other types of distorters also.

When a motion picture or still projector directs an image onto a screen which is inclined with respect to the axis of the projector, the inclination of the screen inherently tends to distort the projected image by reason of the fact that some portions of the inclined screen are farther away from the projector than are other portions. At those areas which are farther away from the projector, the image is spread out more than at the portions of the screen which are nearer to the projector, so that persons or objects in the projected picture are not in proper proportion. To compensate for this error which occurs in projecting onto an inclined screen, a device embodying the invention may be designed to distort the image prior to projection to a condition in which those areas which will ultimately be expanded by the inclination of the screen are, before projection, relatively smaller in size than are other portions of the image. Preferably, the predistortion of the image is progressive in nature, to compensate for the similarly progressive distortion produced by projection onto an inclined screen. Thus, the appearance of the ultimate image on the screen may be completely undistorted, with all portions of the image in proper proportion, and further with substantially uniform illumination of the image across its area.

To attain the above results, I may utilize a fiber optic device consisting of a bundle of generally parallel fibers, with individual ones of the fibers tapering as they extend from a first end of the bundle to its opposite end. The image to be projected is then applied to one end of the bundle, as by positioning of an illuminated film adjacent that end, and the distorted image emits from the opposite end of the bundle, to be projected from that end to the inclined screen. The distortion in the image as it passes through the fiber optic bundle is produced by purposely designing different fibers of the bundle to be tapered to different extents. Thus, one particular segment of the initial image, which segment is to pass through a predetermined one of the fibers, may be expanded to a considerably increased size at the outlet end of the device, by designing that particular fiber to expand as it advances toward that end; while another individual portion of the image may be expanded less, by a fiber which flares more gradually, or may actually be reduced in size by a fiber which tapers to a reduced cross-section at the outlet end. To attain the desired progressive distortion of the image, the change in taper or flare may be progressive across one transverse section of the fiber optic device. Also, to minimize the extent to which any individual fiber must flare or taper, the fiber optic bundle may have a plane at or near its center, at which the fibers have little or no change in diameter along their length, with the fibers at one side of this center plane tapering toward one end of the device, while the fibers at the other side of the center plane taper in the opposite direction to have a reverse effect on the ultimate image.

The above and other features and objects of the present invention will be better understood from the following detailed description of the typical embodiment illustrated in the accompanying drawing, in which.

Figure 1:
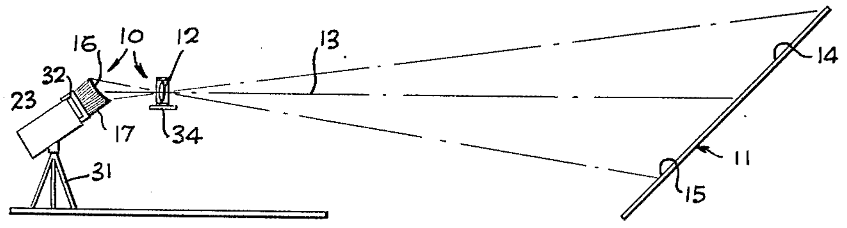
FIG. 1 is a somewhat diagrammatic side view representation of an inclined screen projection system constructed in accordance with the invention.

Referring first to FIG. 1, I have represented at 10 a projector assembly to be used in projecting a picture onto an inclined screen 11, which may typically be a rear projection screen adapted to be viewed from its right side as seen in FIG. 1. The image is projected onto the screen 11 by a conventional projection lens represented at 12, with the main projection or optical axis of this lens being represented by the line 13. Since screen 11 is inclined with respect to this axis 13 of the projection lens 12, the portion of the image which falls on the upper part of screen 11, for example at the point designated 14 in FIG. 1, must travel considerably farther between the lens and screen than does the portion of the image falling on the lower part 15 of the screen. Thus, the upper part of the image tends to spread out to an increased dimension in all directions, so that objects at the top of the screen appear larger than they should relative to objects at the bottom of the screen. This tendency for distortion of the image on the screen is of course progressive between the points 14 and 15.

The image to be projected on the screen is picked up by lens 12 from the discharge face 16 of a fiber optic device 17 constructed in accordance with the invention. A film 18 carrying the primary undistorted image is positioned against the left or inlet end of the fiber optic device 17, and is illuminated by a projection lamp 19 through the usual condensing lenses 20. The film may be held in position in any suitable manner, as by a glass plate represented at 21, mounted by a plurality of pins 22 (FIGS. 2 and 6) carried by a projector housing 23 and received within openings 24 in the glass plate 21 to allow movement of the plate toward and away from the inlet end of fiber optic device 17. A number of springs 25 disposed about pins 22 may act to urge plate 21 toward the fiber optic device, to clamp film 18 against it. It is to be understood that this particular type of film retaining mechanism is illustrated only typically, and may be replaced by any other convenient apparatus for holding a film or image carrying element at the inlet side of the fiber optic device, either in a still projector or a motion picture projector.

The fiber optic unit 17 consists of a larger number of generally parallel elongated fibers 26, each of which is adapted to conduct light longitudinally within the fiber, from its inlet end to its outlet end, without allowing the light to escape laterally from the fiber. For this purpose, the fibers 26 may be formed of elongated strands of transparent glass, plastic, or any other material conventionally employed in fiber optic units. The fibers are retained in the illustrated closely bundled relation in any suitable manner, as by cementing adjacent fibers together along their lengths with material of lower refractive index than that of the fibers.

Figures 3, 4:
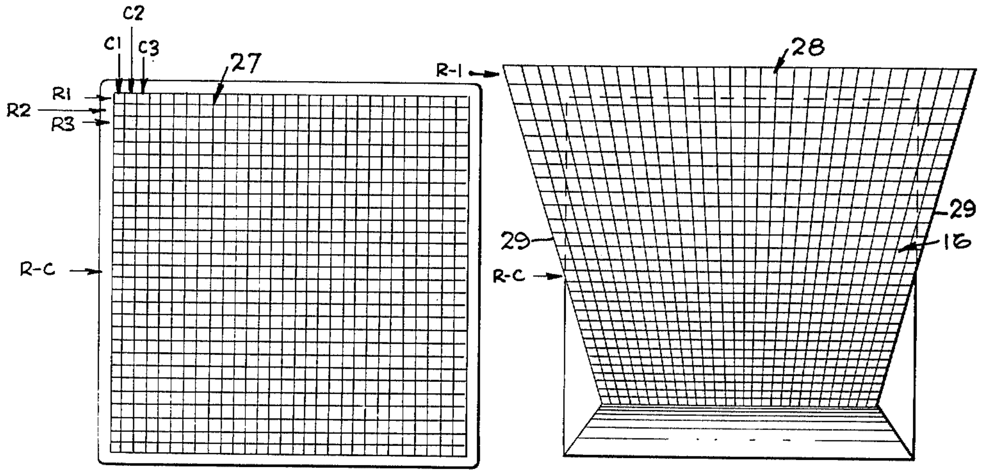
FIG. 3 is a section taken on line 3—3 of FIG. 2.
FIG. 4 is an end view of the fiber optic device, taken on line 4—4 of FIG. 2.

The rear or entrance face 27 of the fiber optic unit 17 may be a planar surface, disposed transversely of the optic axis 28 along which light from lamp 19 and condensing lenses 20 is directed through the center of film 18. The film 18 abuts directly against this planar surface 27, so that individual portions of the illuminated image on the film are picked up by the different fibers 26. FIG. 3 represents the arrangement and proportioning of the light entrance ends of the fibers at the location of face 27. As will be apparent from FIG. 3, the various fibers all desirably have the same cross-section at the location of rear face 27, and are arranged in horizontal rows R–1, R–2, R–3 etc., and vertical columns C–1, C–2, C–3 etc. The overall shape of rear face 27 may therefore be rectangular (see FIG. 3), and of a size corresponding approximately to the size of the image on film 18.

As previously mentioned, the different individual fibers 26 are tapered and flared in cross-section in a manner purposely distorting the image from film 18 as it is transmitted through fiber optic unit 17. This change in cross-section of the fibers causes the light discharge or outlet face 16 of unit 17 to have a changed non-rectangular cross-section different from the rectangular cross-section of entrance face 27. This non-rectangular shape of surface 28 is illustrated in FIG. 4, which indicates clearly that the light discharge surface increases in width as it advances upwardly.

The individual fibers within a vertically central row R–C of the fibers may be designed to be of uniform non-changing cross-section along their entire length. Thus, the portions of the image transmitted through the fibers in this horizontal row are not distorted in any way by device 17, and are exactly the same size when they emit from discharge end 16 of the fibers as when they enter the rear end of the device. In the row of fibers just above R–C, the individual fibers are designed to flare slightly and progressively (that is gradually increase in cross-section) as they extend from rear face 27 to front face 16. In the next higher row, the second one above central row R–C, the individual fibers flare progressively between faces 27 and 16 and at a slightly greater rate than in the first row above R–C. Similarly, the fibers in the third row above R–C flare at a still greater rate, and the fibers in each of the other rows above row R–C flare at a slightly greater rate than in the next lower row. Thus, the portions of the image transmitted through the fibers above row R–C are enlarged by the time they reach discharge face 16 of the fiber optic device, with the extent of the enlargement increasing progressively in an upward direction away from row R–C. Beneath row R–C, the individual fibers taper to a reduced cross-section in extending from light entrance face 27 to discharge face 16 of the fiber optic device. In the first row just beneath row R–C, this flare is relatively slight, so that the corresponding portions of the image are reduced in size only slightly by the fibers of this row. In the next lower row, the taper is slightly greater, so that the corresponding portions of the image are reduced slightly more in size, and similarly for the other rows below row R–C, the extent of taper progressively increases in advancing downwardly away from row R–C, to the lowermost row in which the discharge ends of the fibers are of minimum size.

It will of course be understood from the above description that all of the fibers in any particular row of unit 17 preferably flare or taper identically. Also, it is found desirable that the progressive change in taper from the bottom to the top of unit 17 be uniform or linear, so that the distortion of the image is similarly linear from the bottom of the device to the top. As a result, the opposite side edges 29 of the light discharge face 16 of fiber optic device 17 diverge generally uniformly as seen in FIG. 4. The individual fibers may be approximately square in cross-section, as seen in FIGS. 3 and 4, or may be round or any other convenient shape.

In order to enable all portions of the image on projection screen 11 to be in focus, even though the screen is inclined with respect to lens 12, the discharge face 16 of unit 17 should be disposed at an inclination to lens axis 13, with the direction and extent of inclination being essentially the opposite of the inclination of screen 11. This relationship is illustrated in FIG. 1. Also, a further minor correction may be made, to increase the accuracy of focus of all of the different points of the inclined image on screen 11, by slightly curving the discharge face 16 of unit 17, to form a portion of an hyperbola in vertical cross-section. This cross-section should of course be uniform across the entire horizontal extent of face 16.

In using the illustrated apparatus, film 18 may be slipped into its position of engagement with rear face 27 of unit 17, while glass plate 21 is held away from face 27, and this plate may then be freed for movement against the film to hold it tightly against face 27. The operator may then turn on lamp 19, so that light is passed through condensing lenses 20 and film 18. The image on film 18 causes a difference in the intensity of light passing into the rear ends of the different fibers 26, with the result that each fiber transmits light corresponding to that at a predetermined point on the image. The taper and flare of the different fibers causes the image segments transmitted by the lowermost fibers to be reduced in size, with the image segments in upper rows progressively increasing in size, as has been discussed. The resultant distorted upwardly widening image on face 16 is projected by lens 12 onto inclined screen 11. The inclination of the screen is just sufficient to compensate for the distortion of the image on face 16 in a manner ultimately producing a rectangular image on the screen identical with that on film 18. This is true because the relatively wide portions of the image from the upper row R–1 of fibers are projected by lens 12 onto the lower portion 15 of the screen which is nearest to lens 12, while the narrower image segments from the bottom fibers travel farther to fall on upper portion 14 of the screen, and therefore increase in size as a result of that travel.

In spite of the distortion which the image undergoes in passing from the film to the screen, it is noted that this distortion does not alter the relative brightness of different portions of the image as they appear on the screen. Since the light entrance ends of the fibers are all of equal size, and they all deliver light to equal areas of the screen, the relative brightness at different points on the screen is exactly the same as on the film.

The mounting structure shown in FIG. 1 for supporting the projector parts is obviously diagrammatic in character, and is intended merely as a typical representation of any convenient mounting for the purpose. Projector housing 23 is typically illustrated as mounted on a tripod 31, with unit 17 being connected to housing 23 by a bracket 32 disposed about the rear end of unit 17 and secured to the housing by arms 33. Lens 12 may be mounted to the rest of the projector by a structure 34 attached in any way to housing 23.

Figures 2, 5, 6, 7:
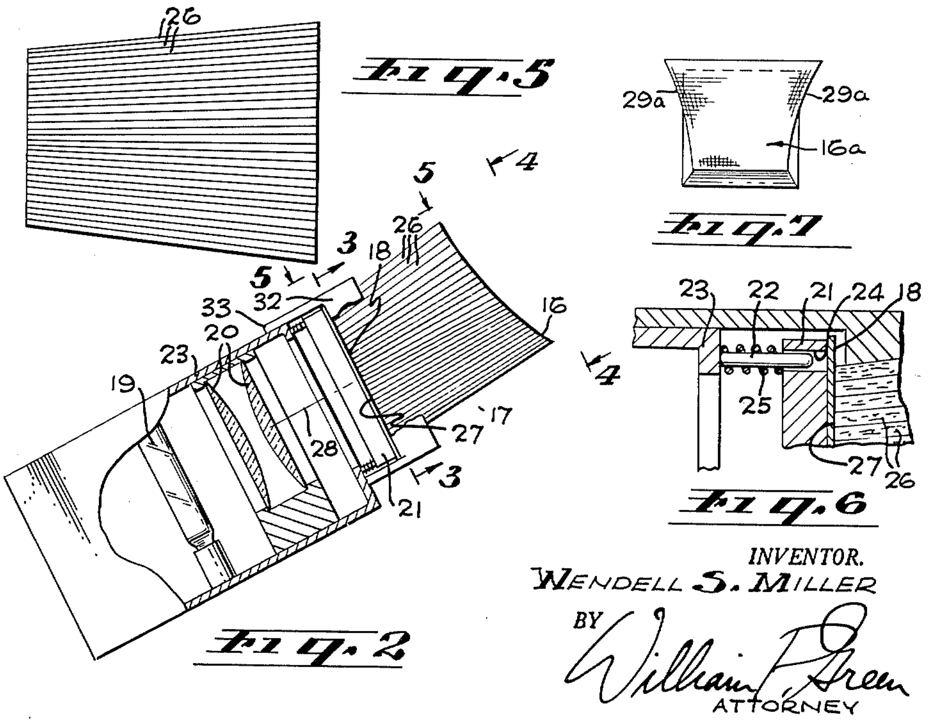
FIG. 2 is an enlarged side view, partially broken away, of a portion of the FIG. 1 projector.
FIG. 5 is a view of the upper side of the fiber optic device, taken on line 5—5 of FIG. 2.
FIG. 6 is an enlarged section through the film retaining portion of the device.
FIG. 7 is a view similar to FIG. 4 of a second form of device.

FIG. 7 is a view similar to FIG. 4, but showing a variational form of fiber optic device in which the opposite side edges 29a of the device curve as they extend upwardly. This curvature may in some cases be desirable to compensate for the difference in the lateral and longitudinal magnification ratios of the projection lens, and assure the formation of an exactly rectangular image on screen 11.

I claim:

1. The combination comprising a projector, and a screen inclined relative to said projector and onto which an image is projected thereby, said projector including a fiber optic device constructed to compensate for the distortion which would otherwise be caused in the image by virtue of said inclination of the screen, said fiber optic device including a bundle of generally parallel light transmitting fibers for transmitting an image from a first end of said bundle to a second end thereof, individual ones of said fibers being of tapered configuration to have a smaller cross-section at one end of said bundle than at the other, different fibers of said bundle being tapered to different extents to distort the image at said second end of the bundle as compared with the image at said first end, said projector including a lens relative to which the screen is inclined acting to project an image from said second end of the bundle onto said screen, said second end of the bundle having a light discharge face which is inclined with respect to said lens in a direction essentially the opposite of the direction of inclination of said screen.

2. The combination comprising a projector, and a screen inclined relative to said projector and onto which an image is projected thereby, said projector including a fiber-optic device constructed to compensate for the distortion which would otherwise be caused in the image by virtue of said inclination of the screne, said fiber-optic device including a bundle of generally parallel light transmitting fibers for transmitting an image from a first end of said bundle to a second end thereof, individual ones of said fibers being of tapered configuration to have a smaller cross section at one end of said bundle and at the other, different fibers of said bundle being tapered to different extents changing progressively between two opposite sides of the bundle to progressively distort the image at said second end of the bundle as compared with the image at said first end, various of said fibers having a ratio of inlet area to outlet area different from others of said fibers, said fibers terminating in an essentially hyperbolic curve at said second end of said bundle.

3. The combination comprising a projection lens system having an optic axis, means for holding a projection transparency bearing information significant indicia in a first state of perspective representation, means for illuminating such a transparency while there retained, optical image distortion producing means so disposed as to receive light from said illumination producing means after passage through said transparency and to deliver the same light to said projection lens in such optical configuration as will produce through said projection lens an in-focus image of the indicia on said transparency on an inclined screen in a different state of perspective representation, said optical distorter being adapted to convert the optical image of a planar transparency into the image of a hyperbolic cylinder generally inclined with respect to the optic axis of said projection lens at an angle opposed to the angle of inclination of said inclined screen with respect to said axis.

References Cited by the Examiner

UNITED STATES PATENTS

| | | | |
|---|---|---|---|
| 1,651,574 | 12/27 | Beechlyn | 352—85 |
| 2,825,260 | 3/58 | O'Brien | 88—1 |
| 3,033,071 | 5/62 | Hicks | 88—1 |

NORTON ANSHER, *Primary Examiner.*

WILLIAM MISIEK, *Examiner.*